F. O. GOODWIN.
Improvement in Lightning Rods.
No. 124,264.            Patented March 5, 1872.
Fig. 5.
Fig. 3.          Fig. 4.
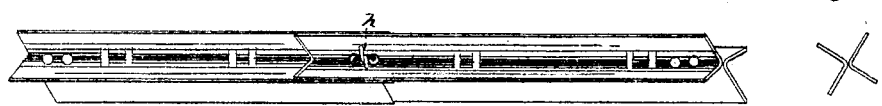 
Fig. 6.
Fig. 1.
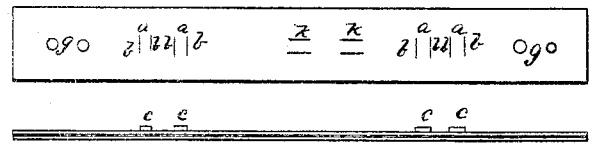
Fig. 2.
Witnesses:          Inventor:
William Reilly          Frederick O Goodwin
Joseph H Orndorff 124,264

UNITED STATES PATENT OFFICE.

FREDERICK O. GOODWIN, OF PHILADELPHIA, PENNSYLVANIA, ASSIGNOR OF ONE-HALF HIS RIGHT TO FRANK GOODWIN, OF SAME PLACE.

IMPROVEMENT IN LIGHTNING-RODS.

Specification forming part of Letters Patent No. 124,264, dated March 5, 1872.

*To all whom it may concern:*

Be it known that I, FREDERICK O. GOODWIN, of Philadelphia, Pennsylvania, have invented a new and useful Improvement in the Construction of Lightning-Rods; and I do hereby declare that the following is a full, clear, and exact description of the construction thereof, reference being had to the annexed drawing forming part hereof and to the letters of reference marked thereon, in which drawing—

Figure No. 1 is a top view of the strips of sheet metal of which the rod is composed, with indentations and connection-holes. Fig. No. 2 is an edge view of the strips shown in Fig. No. 1. Fig. No. 3 is a perspective view of the strips after being passed through rollers, with mode of connection. Fig. No 4 is an end view of rod, as shown in Fig. No. 3. Fig. No. 5 is a perspective view of finished rod. Fig. No. 6 is a view of staple.

Construction.

I take two strips of sheet metal, and place one directly over the other; they are then punched, as shown at $a\ a\ a\ a$, Fig. No. 1, the metal being cut only at the sides $b\ b\ b\ b\ b\ b\ b\ b$, Fig. No. 1, and forced through the strips, as shown at $c\ c$, Fig. No. 2. They are then spread by a blow or otherwise, rendering it impossible to return to their former position, thereby firmly fastening them together. It may be desirable to cut the metal lengthwise, as shown at K, Fig. No. 1, instead of crosswise, as shown at B, Fig. No. 1. I then punch two connection-holes in each end of the strips, as shown at $g\ g$, Fig. No. 1. The strips are then passed through rollers, rolling them into the form as shown in Figs. Nos. 3 and 4. Finally, it is twisted as shown from $d$ to $e$, Fig. No. 5. The rod is not left without being twisted, as shown from $d$ to $f$, Fig. No. 5, only when it is desirable to obtain greater stiffness for the part of the rod elevated above the buildings to receive the point.

Mode of Connection.

I take the end, Fig. No. 4, of one of the sections to be connected, and separate the strips until they admit the end of the other section to be connected, which is then inserted until the connection-holes are opposite each other; I then pass a staple, Fig. No. 6, through them and twist the ends together, as shown at $h$, Fig. No. 3. I have used pieces of rod that were not twisted, in describing the mode of connection, with the object of giving a better view.

I do not claim a twisted rod, as it is already patented to T. T. Kinsey, June 8, 1869, nor the riveting of the strips there shown; but What I do claim as new, and desire to secure by Letters Patent, is—

1. The mode of fastening together the strips forming a lightning-rod by indentation, substantially as shown and described.

2. The method of connecting the sections together, in forming a continuous rod, by staples, substantially as shown and described.

FREDERICK O. GOODWIN.

Witnesses:
WILLIAM REILLY,
JOSEPH H. ORNDORF.